Patented Oct. 7, 1924.

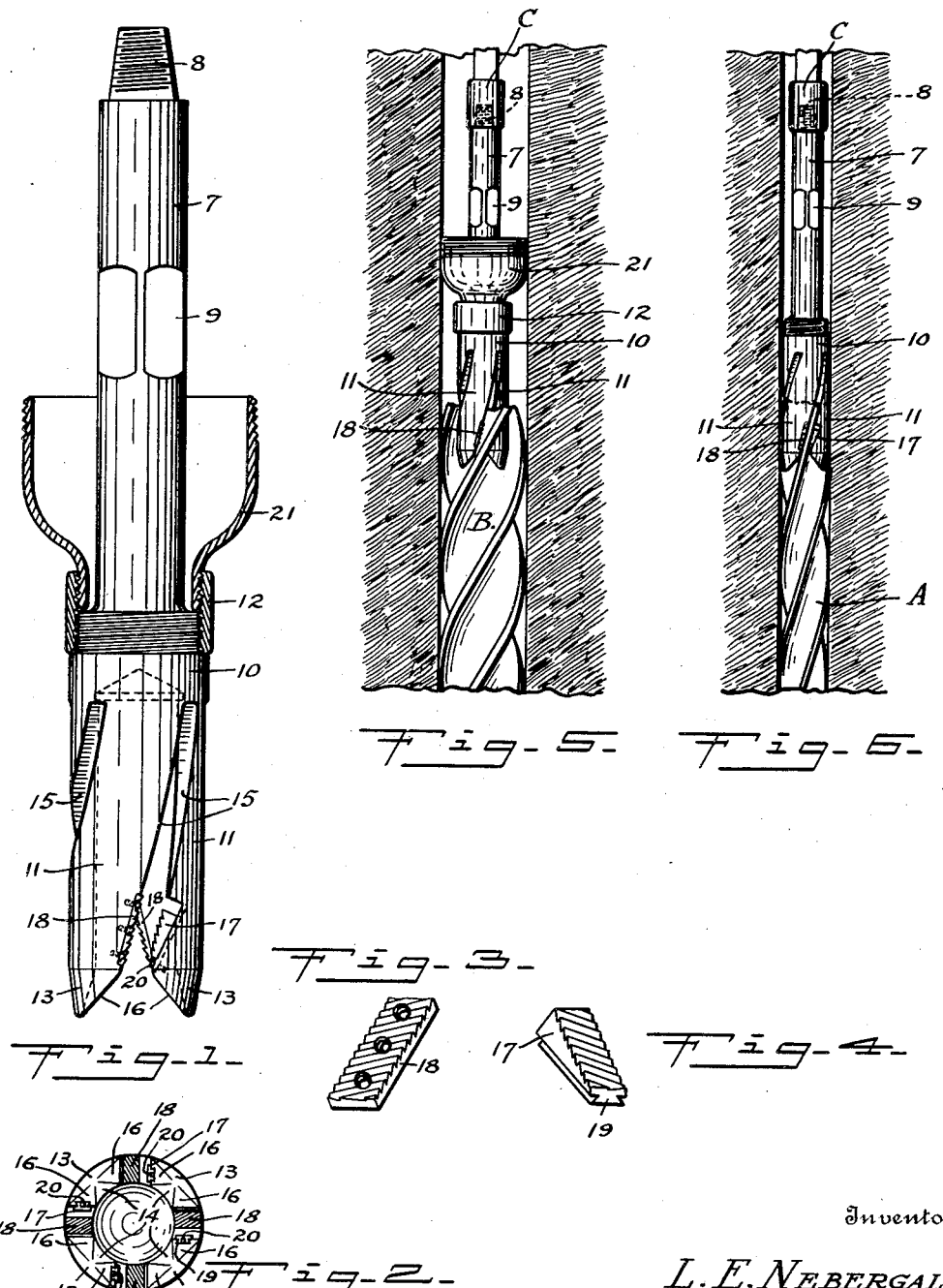

1,511,061

UNITED STATES PATENT OFFICE.

LORAN E. NEBERGALL, OF DENVER, COLORADO.

FISHING TOOL FOR DEEP-WELL AUGER STEMS.

Application filed January 8, 1923. Serial No. 611,360.

*To all whom it may concern:*

Be it known that I, LORAN E. NEBERGALL, a citizen of the United States, residing in the city and county of Denver, in the State of Colorado, have invented certain new and useful Improvements in Fishing Tools for Deep-Well Auger Stems, of which the following is a specification.

My invention relates to tools and implements for deep-well drilling, and particularly to devices for fishing in deep-wells for the recovery of drilling tools which have been lost therein by accident or breakage. It is the especial object of my invention to provide a fishing-tool adapted for the recovery of portions of helically fluted, winged or ribbed auger-stems of the type shown in United States Patent No. 1,188,982, issued to me June 27, 1916, in case such auger-stems should be broken off at the winged or fluted portions thereof. A further object of my invention is to provide a fishing-tool of the character above mentioned which will be guided by the sides of the hole so as to be centered above the broken end of the auger-stem which is to be recovered. A further object of my invention is to provide, in combination with a fishing-tool of the character described, means by which the same may be centered or guided in holes which are larger than the head of the tool, whereby to enable the use of the same fishing-tool for auger-stems of several sizes. A further object of my invention is to provide a fishing-tool of this type which may be attached to the lower end of a string of pipe or well-casing so that said pipe may be used in addition to the usual rope or cable for hoisting the tools from the hole after the broken auger-stem has been engaged.

In the accompanying drawings Fig. 1 is a side view of a fishing tool embodying my invention, including the auxiliary guide-member, the latter being in longitudinal section, Fig. 2 is a bottom end view of the tool, Fig. 3 is a detail perspective view of one of the fixed jaws or slips, Fig. 4 is a detail perspective view of one of the sliding jaws or movable slips which engage the wings or flanges of the broken-off auger-stem, Fig. 5 is a view showing the fishing-tool with auxiliary guide, engaged with a broken auger-stem, and Fig. 6 is a similar view showing the tool as used for the recovery of a broken auger-stem of the same diameter as the head of the fishing-tool.

In carrying out my invention the main body of the tool is constructed from an integral piece of metal, preferably steel or an alloy thereof, which by heat-treatment or the like is caused to have such toughness and resiliency as not to be liable to fracture or excessive distortion under the stresses to which it is subjected when in use. The cylindrical shank or stem 7 has at the upper end thereof a tapered threaded portion or pin 8, of the usual or standard form used for deep-well drilling-tools, and adapted for connection with the internally threaded sockets or boxes at the lower ends of auger-stems, jars, or other tools of a string. The shank or stem 7 also has the usual wrench-square 9 near its upper end, for use in screwing the fishing-tool to the next tool above it in the string. At its lower end the shank 7 is enlarged into the cylindrical head 10, from which the prongs 11 extend downwardly. The upper portion of the head 10 is threaded and adapted thereby to receive a pipe-coupling 12, for a purpose which will presently appear. The prongs 11 may be regarded as formed by cutting away parts of a downwardly extended portion of the head 10, and, although they are not necessarily produced in this particular manner, their shape is the same as would result from boring out cylindrically the downwardly extended portion of the head, conically bevelling the lower end of the bored portion both internally and externally to provide an outer conical face 13 and an inner conically bored face 14, then forming a plurality of helical slots extending through the wall of the bored portion, so that the resulting prongs have helicoid adjacent sides 15, and finally bevelling the ends of the prongs at the lower ends of the adjacent helicoid sides 15 to form the faces 16. Each of the prongs 11 thus has a pointed or tapering end-portion formed by the faces 13, 14 and 16. At the lower ends of the helicoid side-faces of the prongs the same are recessed to receive the jaws or slips 17 and 18. The slips 18 are fixedly secured to the prongs, and the serrated faces thereof form in effect a continuation of the helicoid side-faces of the prongs. The slips 17 are approximately wedge-shaped, each being serrated at one side similar to the fixed slips 18, and at the opposite side having a dove-tail 19 which fits slidably in a groove therefor in the side of the respective prong. A pin 20 at the lower end of the groove normally prevents the slip from falling out of the same. The teeth or serrations on the adjacent faces of each pair of the slips are preferably inclined to extend diagonally across said faces, as best shown in Figs. 3 and 4, the inclination of the teeth being upward from the outer to the inner edges of said faces. The general planes of the toothed faces of each pair of the slips are substantially parallel, but the dove-tail guide at the back of the movable slip diverges from said planes, so that by upward movement of the slip 17 the same recedes from the fixed slip 18, and by downward movement thereof said slip 17 approaches the fixed slip 18.

In the use of the described fishing-tool for the recovery of a broken-off portion of a fluted or winged auger-stem A, of the same diameter as the head 10 of the fishing-tool, said tool is connected with the lower end of a string, (consisting usually of jars C adjoining the fishing-tool, an ordinary auger-stem above the jars, and a rope-socket above the auger-stem), and the string of tools is lowered into the hole in the usual way. Upon reaching the upper end of the broken-off portion of the auger-stem A the pointed ends of the prongs 11 cause said prongs to be guided between the wings or flanges of said stem, so that the flanges enter the helical slots between the prongs. The length of said slots is such that should the stem A be broken off diagonally the flanges at the higher side may enter the slots far enough to enable the flanges at the opposite or lower side to also enter the lower portions of the corresponding slots and be engaged by the slips therein. As the flanges of the broken stem enter the slots the movable slips 17 are pushed upwardly, so that they recede from the fixed slips far enough to allow the flanges to pass freely between them. Then upon upward movement of the fishing-tool the movable slips tend to move downwardly and thus clamp against the sides of the flanges so that the latter are securely held between the serrated faces of the pairs of slips. The broken auger-stem, being thus engaged as shown in Fig. 6, may be hoisted out of the hole, and if the stem should be stuck or wedged in the hole it may be worked loose by the use of jars in the manner well-known in the art. In some cases it may be undesirable to depend entirely upon the string of fishing-tools for both loosening the broken stem and hoisting the same from the hole, as it may happen that when the tension upon the hoisting-cable is relaxed, to effect the operation of the jars, the partially loosened tools will drop back and again become wedged or stuck at the original position, so that what is gained at one upward stroke of the jars will be lost during the succeeding downward stroke. In such cases, a string of pipe or well-casing may be lowered into the hole and screwed onto the threaded upper portion of the head 10 of the fishing-tool, so that by applying jacks to said string of pipe a constant upward pull may be exerted upon the fishing-tool and thence to the auger-stem and the other tools carried by it. Then, by pulling intermittently upon the usual string of tools, connected with the stem of the fishing-tool and extending up through the pipe, the jars of said string of tools may be operated to apply upward hammering blows upon the stuck tools, and each gain or upward movement of the latter be conserved by jacking up the pipe-string which is attached to the fishing-tool.

When the fishing-tool is to be used for the recovery of a broken auger-stem which is of larger diameter than the head 10 of the tool, the pipe-coupling 12 is screwed onto the head, and a swage-nipple 21 is screwed into the upper end of said coupling, as represented in Figs. 1 and 5, the diameter of the upper enlarged end-portion of the swage-nipple being such as to substantially fit the drilled hole, whereby the spear or fishing-tool will be centered in the hole and thus guided so that the prongs 11 will pass between the wings or flanges of the broken stem B. In the manufacture of the winged auger-stems the twist or pitch of the helical flanges may be the same for stems of all diameters, so that the portions of the flanges which enter the helical slots and are engaged by the slips may be the same for all sizes of stems above a determined minimum. The auger-stems of the larger diameters may be regarded as produced by radial lengthening of the flanges, so that the form of the inner portions of the flanges remains the same for all diameters above that selected as the size for the head of the fishing-tool.

When the auxiliary guide, formed by the swage-nipple 21, is employed, a string of pipe may be screwed onto the threaded upper end of said nipple, and employed in the same manner as when screwed directly onto the threaded upper portion of the head 10, in the special mode of operation hereinbefore described.

It may be noted that by reason of the upward and inward inclination of the teeth on the adjacent faces of the slips 17 and 18, when said teeth are engaged with the broken auger-stem and a pull is exerted thereon, there is a tendency to push the slips inwardly, toward the central vertical axis of the tool. In consequence of this tendency, should any of the slips be broken while in use, the broken part will not be dislodged but will remain in place until the tool has been withdrawn from the hole and disengaged from the auger-stem.

Now, having described my invention, what I claim and desire to secure by Letters Patent is:

1. In a device of the class described, a head adapted to be guided by the sides of a drilled hole to substantially center the same therein, means for connecting said head with suspended supporting means, a plurality of circumferentially spaced and terminally tapered prongs extending downwardly from said head, said prongs having between them slots of substantially uniform width, and means in said slots at the adjacent sides of the prongs for clamping the flanges of a broken auger-stem.

2. In a structure as set forth in claim 1, means on said head adapted for engagement with a tubular support in addition to the suspended supporting means, the latter being operable within the tubular support.

3. In a device of the class described, a cylindrical head having a coaxial integral upwardly extending shank adapted for connection with supporting means, a plurality of prongs spaced symmetrically about the axis of said head and extending downwardly therefrom, the adjacent sides of said prongs having helicoid surfaces, and serrated slips arranged on said adjacent sides of the prongs and adapted to engage and automatically clamp between them the flanges of a broken-off auger-stem after engagement therewith by the entry of said flanges between the prongs.

4. A fishing-tool for deep-well auger-stems of the class described, comprising a cylindrical head having an integral upwardly extending shank adapted for connection with suspended supporting means, a plurality of circumferentially spaced prongs integral with said head and having helical slots between them, a fixed slip and a movable slip mounted on the sides of said prongs at the lower end of each of said helical slots, and means engageable with the cylindrical head for guiding and centering the same in a hole of greater diameter than said head.

5. A fishing-tool for deep-well auger-stems of the class described, comprising a plurality of helical terminally tapered prongs uniformly and symmetrically spaced about a common axis, serrated clamping means arranged on the adjacent sides of said prongs, a head carrying said prongs and having means for guiding and centering the same in a drilled hole, and means for suspending said head for vertical movement in the hole.

L. E. NEBERGALL.